United States Patent
Bian et al.

(10) Patent No.: US 11,137,543 B2
(45) Date of Patent: Oct. 5, 2021

(54) POLARIZERS WITH AN ABSORBER

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/727,400

(22) Filed: Dec. 26, 2019

(65) Prior Publication Data
US 2021/0199887 A1    Jul. 1, 2021

(51) Int. Cl.
G02B 6/12      (2006.01)
G02B 6/126     (2006.01)
G02B 6/122     (2006.01)
G02B 6/27      (2006.01)

(52) U.S. Cl.
CPC .......... *G02B 6/126* (2013.01); *G02B 6/1228* (2013.01); *G02B 6/2733* (2013.01)

(58) Field of Classification Search
CPC ...... G02B 6/126; G02B 6/1228; G02B 6/131; G02B 2006/12061
USPC ........................................ 385/11, 14, 30, 42
See application file for complete search history.

(56) References Cited

U.S. PATENT DOCUMENTS

| | | | |
|---|---|---|---|
| 3,765,746 A | 10/1973 | Ashley et al. | |
| 4,372,641 A * | 2/1983 | Johnson | G02B 6/1228 385/129 |
| 4,943,131 A * | 7/1990 | Taki | G02B 6/12002 385/130 |
| 6,169,825 B1 * | 1/2001 | Morey | G02B 6/126 385/11 |
| 6,327,403 B1 * | 12/2001 | Danziger | G02B 6/03644 385/126 |
| 7,181,114 B2 * | 2/2007 | Lee | G02F 1/3517 385/122 |
| 7,260,281 B2 * | 8/2007 | Salib | G02F 1/2257 385/11 |
| 8,625,943 B2 * | 1/2014 | Soma | G02B 6/12019 385/38 |
| 9,470,844 B1 | 10/2016 | Ma et al. | |
| 10,989,874 B2 * | 4/2021 | Liu | G02B 5/18 |
| 2005/0123232 A1 * | 6/2005 | Piede | G02B 6/4207 385/14 |
| 2008/0199128 A1 * | 8/2008 | Tanaka | G02B 6/2821 385/14 |
| 2013/0343695 A1 * | 12/2013 | Ben Bakir | G02B 6/126 385/11 |

(Continued)

OTHER PUBLICATIONS

"Integrated Photonics" by Pollock et al, 2003 (Year: 2003).*

(Continued)

*Primary Examiner* — Robert Tavlykaev
(74) *Attorney, Agent, or Firm* — Thompson Hine LLP; Anthony Canale

(57) ABSTRACT

Structures for a polarizer and methods of fabricating a structure for a polarizer. A first waveguide core includes a section and a taper connected to the section. A second waveguide core is laterally positioned adjacent to the taper of the first waveguide core. An absorber is connected to the section of the first waveguide core. The absorber is composed of germanium.

17 Claims, 6 Drawing Sheets

(56) References Cited

U.S. PATENT DOCUMENTS

| | | | | |
|---|---|---|---|---|
| 2014/0105544 A1* | 4/2014 | Ushida | ............... | G02B 6/243 385/77 |
| 2015/0234138 A1* | 8/2015 | Sorger | ............... | G02B 6/3596 385/16 |
| 2015/0338577 A1* | 11/2015 | Shi | ............... | G02B 6/125 385/11 |
| 2015/0362764 A1* | 12/2015 | Cunningham | ............... | G02F 1/0018 385/2 |
| 2017/0192171 A1* | 7/2017 | Shi | ............... | G02B 6/126 |
| 2018/0372957 A1* | 12/2018 | Wang | ............... | G02B 6/2726 |
| 2019/0049743 A1* | 2/2019 | Akiyama | ............... | H01S 5/5018 |
| 2020/0150338 A1* | 5/2020 | Chiles | ............... | G02B 6/126 |

OTHER PUBLICATIONS

"Broad-Band Optical Directional Couplers and Polarization Splitters" by Hereth et al, Journal of Lightwave Technology, vol. 7, No. 6, pp. 925-930 (Year: 1989).*

"Design of Polarization-Independent CoarseWavelength Splitters Based on Ridge-Waveguide Directional Couplers" by Lee, International Journal of Optics, vol. 2011, Article ID 263182 (Year: 2011).*

Bian et al., "Transverse-Electric (TE) Pass Polarizers", filed Jul. 3, 2019 as U.S. Appl. No. 16/502,667.

Bian et al., "Non-Planar Waveguide Structures", filed Jul. 10, 2019 as U.S. Appl. No. 16/507,642.

Dai et al., "Compact broadband polarizer based on shallowly-etched silicon-on-insulator ridge optical waveguides", Optics Express vol. 18, Issue 26, pp. 27404-27415 (2010).

Sun et al., "Experimental demonstration of a hybrid plasmonic transverse electric pass polarizer for a silicon-on-insulator platform", Optics Letters vol. 37, Issue 23, pp. 4814-4816 (2012).

Huang et al., "CMOS compatible horizontal nanoplasmonic slot waveguides TE-pass polarizer on silicon-on-insulator platform", Optics Express vol. 21, Issue 10, pp. 12790-12796 (2013).

Bian et al., "Hybrid vanadate waveguiding configurations for extreme optical confinement and efficient polarization management in the 'near-infrared'", Nanoscale, 2018, 10, 16667.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Bian et al., "Polarizers and Polarization Splitters Phase-Matched With a Back-End-Of-Line Layer ", filed Mar. 4, 2019 as U.S. Appl. No. 16/291,346.

Bian et al., "Polarizers With Confinement Cladding", filed Nov. 18, 2019 as U.S. Appl. No. 16/686,782.

* cited by examiner

POLARIZERS WITH AN ABSORBER

BACKGROUND

The present invention relates to photonics chips and, more specifically, to structures for a polarizer and methods of fabricating a structure for a polarizer.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

Polarizers are a type of optical component commonly found in photonics chips. A polarizer is configured to receive an optical signal containing multiple modes (e.g., transverse electric (TE) mode and transverse magnetic (TM) mode) and to allow only one of these modes to propagate while the other mode is eliminated. Polarizers generally have large footprints that consume significant layout area on the photonics chip.

Improved structures for a polarizer and methods of fabricating a structure for a polarizer are needed.

SUMMARY

In an embodiment of the invention, a structure for a polarizer is provided. The structure includes a first waveguide core having a section and a taper connected to the section. A second waveguide core is laterally positioned adjacent to the taper of the first waveguide core. An absorber is connected to the section of the first waveguide core. The absorber is composed of germanium.

In an embodiment of the invention, a method of forming a structure for a polarizer is provided. The method includes forming a first waveguide core having a section and a taper connected to the section. The method further includes forming a second waveguide core that is laterally positioned adjacent to the taper of the first waveguide core, and forming an absorber that is connected to the section of the first waveguide core. The absorber is comprised of germanium.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
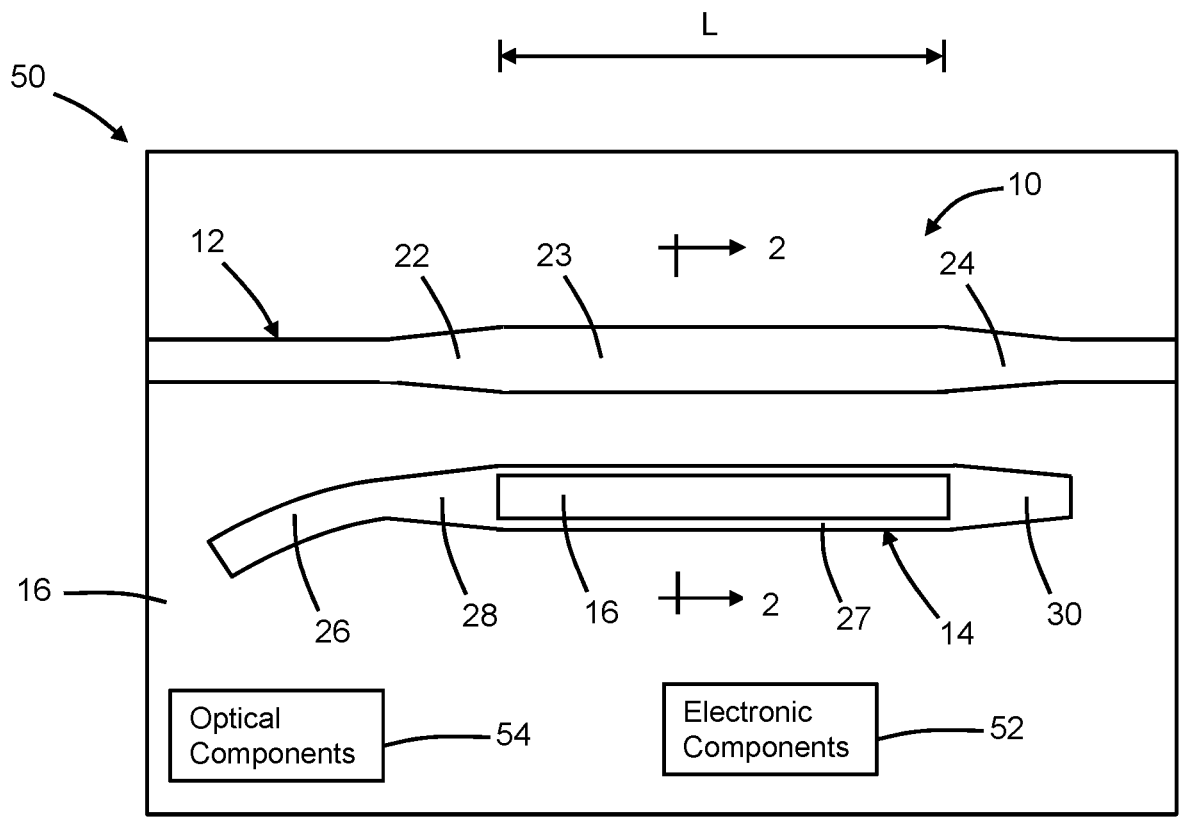
FIG. 1 is a top view of a structure at an initial fabrication stage of a processing method in accordance with embodiments of the invention.
Figure 2:
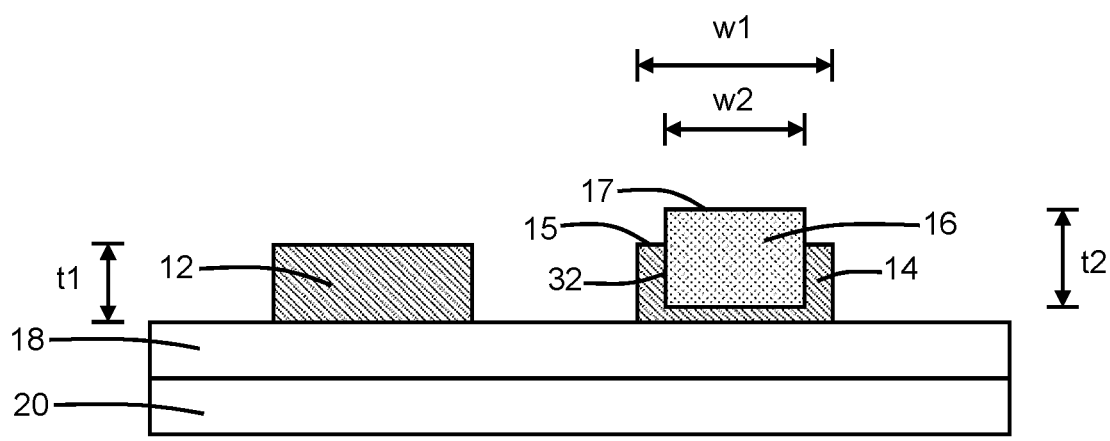
FIG. 2 is a cross-sectional view taken generally along line 2-2 in FIG. 1.

With reference to FIGS. 1, 2 and in accordance with embodiments of the invention, a structure 10 for a polarizer includes a waveguide core 12, a waveguide core 14, and an absorber 16 that is coupled to the waveguide core 14. The waveguide cores 12, 14 and absorber 16 are positioned over a dielectric layer 18. The waveguide core 12 and the waveguide core 14 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 18 and a substrate 20 composed of a single-crystal semiconductor material, such as single-crystal silicon, under the buried insulator layer. The waveguide core 12 and the waveguide core 14 may be patterned from the device layer of the silicon-on-insulator wafer by lithography and etching processes during front-end-of-line processing. The device layer of the silicon-on-insulator wafer may be fully etched to define a rib waveguide as shown or, alternatively, only partially etched to define a ridge waveguide. The waveguide core 12 and the waveguide core 14, which may be concurrently formed from the same layer of material, may have coplanar or substantially coplanar top and bottom surfaces.

The waveguide core 12 is laterally spaced from the waveguide core 14. The waveguide core 12 includes sections of different width with a taper 22 that joins a non-tapered section of smaller width with a non-tapered section 23 of larger width and another taper 24 that joins the non-tapered section 23 of larger width with another non-tapered section of smaller width. In an embodiment, the non-tapered section 23 may be a straight section. The waveguide core 14 includes a bend 26 that is coupled to a non-tapered section 27 of larger width by a taper 28 and another taper 30 coupled to the non-tapered section 27. The bend 26 and the taper 30 may terminate opposite ends of the waveguide core 14. The waveguide core 14 may have a length, L, measured from an interface at the intersection of the taper 28 and section 27 to another interface at the intersection of the taper 30 and section 27, a thickness t1, that may be constant over its length, and a width, w1, that may be constant over its length.

Optical signals propagating as light with both transverse magnetic (TM) and transverse electric (TE) mode components may be guided on the photonics chip by the waveguide core 12 to the structure 10. One mode component, such as the TE mode component (e.g., the fundamental TE mode component), of the light may be laterally coupled from the waveguide core 12 to the waveguide core 14 due to phase matching. The dropped mode component of the light is absorbed within the structure 10. The widening of the waveguide core 12 at the taper 22 may promote the selective transfer of light from the waveguide core 12 to the waveguide core 14. The other mode component, such as the TM mode component, of the light passes through the structure 10 with negligible loss to be further guided on the photonics chip 50 to a downstream destination by the waveguide core 12. The bend 26 may reduce cross-talk between the waveguide cores 12, 14, and the taper 30 may minimize back reflection.

The absorber 16 is localized over the waveguide core 14. In particular, the absorber 16 is localized over the non-tapered section 27 of the waveguide core 14 and is directly connected to the non-tapered section 27 of the waveguide core 14. The absorber 16 is composed of a material that promotes efficient absorption of light of the dropped mode component in comparison with the environment about the waveguide core 14 in the absence of the absorber 16. In an embodiment, the absorber 16 may be composed of germanium. In an embodiment, the absorber 16 may be fully composed of germanium. In an embodiment, the absorber 16 may be composed of a silicon-germanium alloy. In an embodiment, the absorber 16 may be fully composed of a silicon-germanium alloy. The material (e.g., germanium) constituting the absorber 16 has a higher refractive index than the material (e.g., silicon) of the waveguide core 14. In an embodiment, the absorber 16 may be particularly useful for absorbing light in a wavelength range of one (1) to four (4) microns.

The absorber 16 includes a layer of the material that is formed in a trench 32 defined in the waveguide core 14 by lithography and etching processes. The layer may be epitaxially grown from the single-crystal material of the surfaces of the waveguide core 14 about the trench 32 to form the absorber 16, and the layer may then be patterned with lithography and etching processes after growth to remove the epitaxially-grown material from portions of the waveguide core 14 other than the section 27. The patterning may remove the epitaxially-grown material from the waveguide core 14 other than a location coextensive with the trench 32. The waveguide core 12 may be covered by a protective layer during the epitaxial growth, which may be removed after the absorber 16 is formed. The absorber 16 may be positioned in direct contact with the waveguide core 14 (i.e., direct contact with the surfaces of the waveguide core 14 surrounding the trench 32). In an embodiment, the absorber 16 may not directly contact the top surface 15 of the waveguide core 14, but may instead only directly contact the surfaces of the waveguide core 14 surrounding the trench 32 and also project out of the trench 32. The absorber 16 does not contact the waveguide core 12 and is not connected to the waveguide core 12.

The absorber 16 may have a length, L, that is equal or substantially equal to the length of the section 27 of the waveguide core 14. The absorber 16 may be epitaxially grown with a thickness, t2, that is greater than the thickness, t1, of the section 27 such that the absorber 16 projects to a given height above a top surface 15 of the waveguide core 14. In that regard, the absorber 16 may include a top surface 17 that is not coplanar with the top surface 15 of the waveguide core 14 and that is located above the top surface 15. The absorber 16 may have a width, w2, that is narrower than the width, w1, of the waveguide core 14 due at least in part to the formation of the trench 32. The absorber 16 and the section 27 of the waveguide core 14 may each be substantially rectangular over their respective lengths with straight sidewalls that are planar. The absorber 16 is partially embedded in the section 27 of the waveguide core 14 with portions of the waveguide core 14 positioned between the absorber 16 and the sidewalls of the waveguide core 14.

The absorber 16 reduces the size (i.e., footprint) of the structure 10 needed to filter light of mixed polarization into light having a well-defined polarization. The size reduction afforded by the introduction of the absorber 16 increases the available layout area on the photonics chip for other components.

Figure 3:
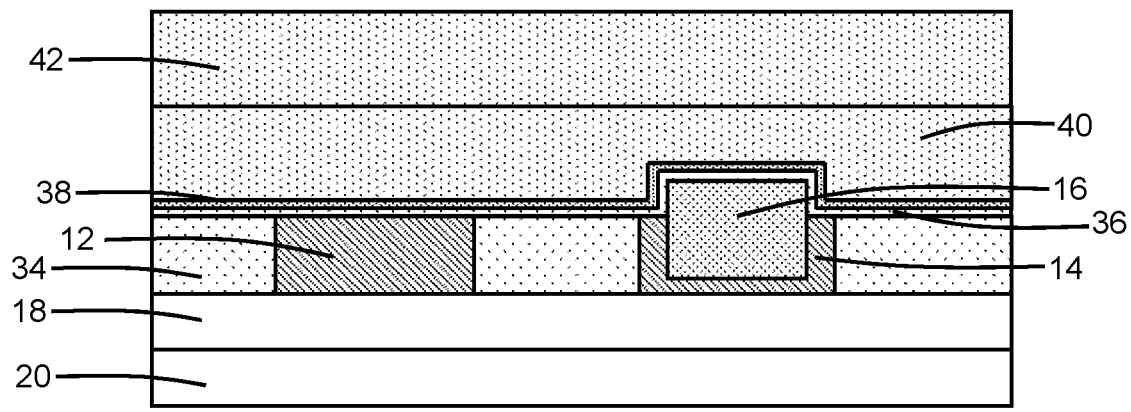
FIG. 3 is a cross-sectional view of the structure at a fabrication stage subsequent to FIG. 2.

With reference to FIG. 3 in which like reference numerals refer to like features in FIG. 2 and at a subsequent fabrication stage, dielectric layers 34, 36, 38, 40 and a back-end-of-line stack 42 are formed over the waveguide cores 12, 14 and absorber 16. The dielectric layers 34, 36, and 40 may be composed of a dielectric material, such as silicon dioxide, deposited by atomic layer deposition or chemical vapor deposition. The dielectric layer 34 may be planarized after deposition with, for example, chemical mechanical polishing to remove topography. The dielectric layer 38, which is optional, may be composed of dielectric material, such as silicon nitride, deposited by chemical vapor deposition or atomic layer deposition over the dielectric layer 36 before depositing the dielectric layer 40. The back-end-of-line stack 42, which is formed over the dielectric layer 40, may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers. In an embodiment, metallization may be absent over the absorber 16.

The structure 10, in any of its embodiments described herein, may be integrated into a photonics chip 50 that includes electronic components 52 and additional optical components 54. For example, the electronic components 52 may include field-effect transistors that are fabricated by CMOS front-end-of-line (FEOL) processing.

In an alternative embodiment, an input waveguide core and an output waveguide core, each composed of silicon nitride and arranged over the waveguide core 12, may be coupled to opposite ends of the waveguide core 12 by respective couplers, which are employed to transfer the optical signals from the input waveguide core to the waveguide core 12 and from the waveguide core 12 to the output waveguide core.

Figure 4:
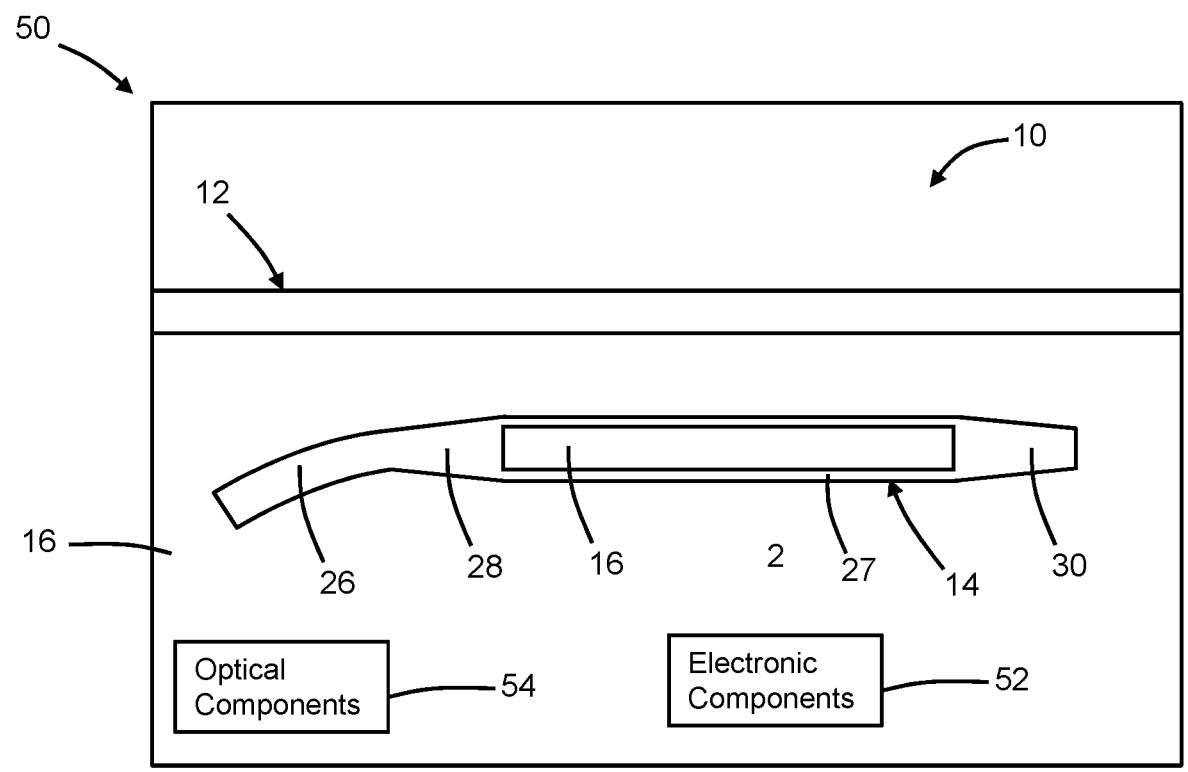
FIG. 4 is a top view of a structure in accordance with alternative embodiments of the invention.

With reference to FIG. 4 in which like reference numerals refer to like features in FIG. 1 and in accordance with alternative embodiments of the invention, the portion of the waveguide core 12 participating in the structure 10 may be straight and, for that reason, may lack the sections of different width and the tapers. The width of the waveguide core 12 may be tailored to couple higher-order TE mode components from the waveguide core 12 to the waveguide core 14.

Figure 5:
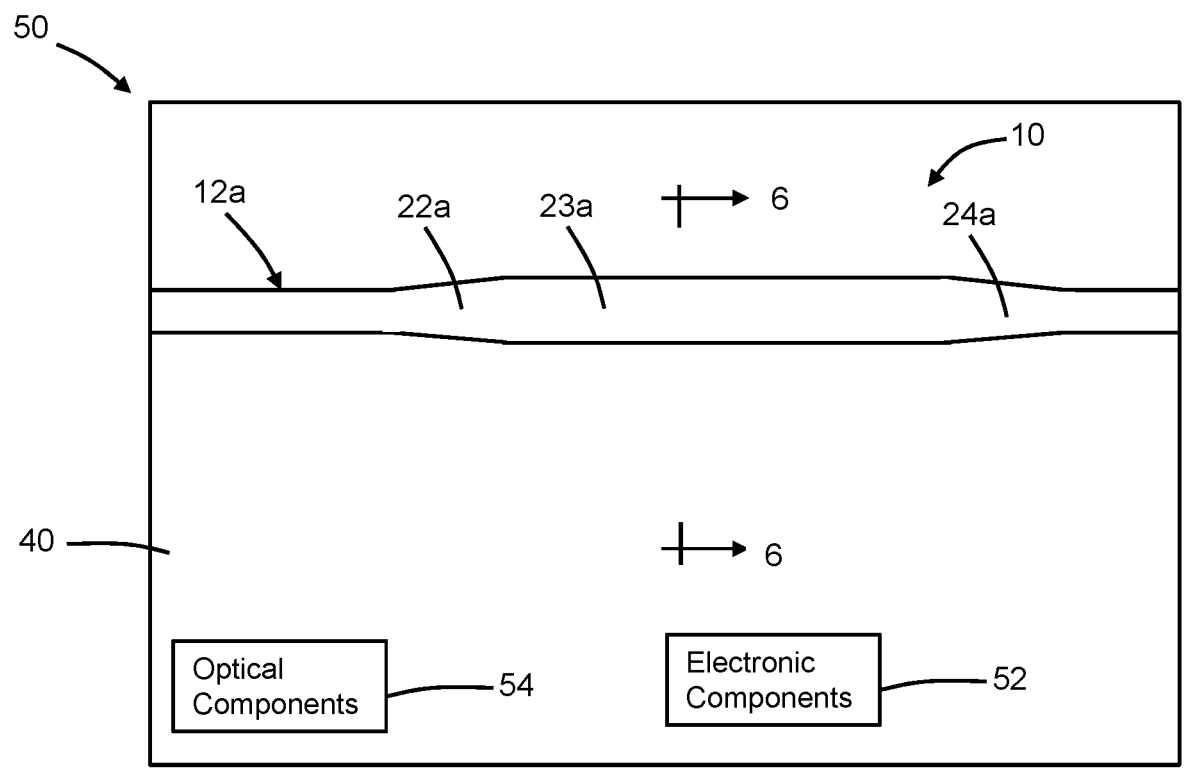
FIG. 5 is a top view of a structure in accordance with alternative embodiments of the invention.
Figure 6:
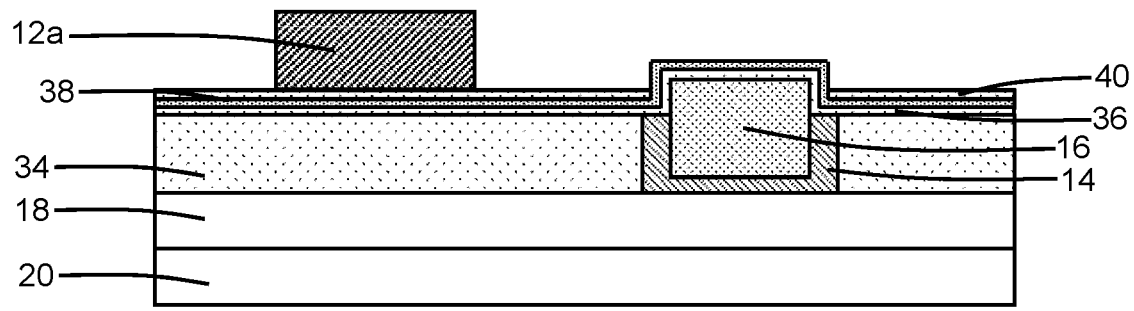
FIG. 6 is a cross-sectional view taken generally along line 6-6 in FIG. 5.

With reference to FIGS. 5, 6 in which like reference numerals refer to like features in FIGS. 1, 2 and in accordance with alternative embodiments of the invention, a waveguide core 12a may replace the waveguide core 12. The waveguide core 12a is formed after forming the waveguide core 14 and absorber 16. The waveguide core 12a may be formed from a layer of a dielectric material, such as silicon nitride, that is deposited and patterned by lithography and etching processes, and the waveguide core 12a may be located over the dielectric layer 40. In an alternative embodiment, the waveguide core 12a may be composed of polysilicon. Similar to the waveguide core 12, the waveguide core 12a includes sections of different width with a taper 22a that joins a non-tapered section of smaller width with a non-tapered section 23a of larger width and another taper 24a that joins the non-tapered section 23a of larger width with another non-tapered section of smaller width.

The waveguide core 12a is located in a vertical direction above, and laterally spaced from, the waveguide core 14 and, therefore, in a different plane than a plane containing the waveguide core 14. The waveguide core 12a may overlap slightly with the absorber 16 in the vertical direction. Light coupling, rejection of the TE mode component, and transmission of the TM mode component in the structure 10 occur as previously described. In an alternative embodiment, the structure 10 including the waveguide core 12a may rely on the waveguide core 14 as an absorber for light wavelengths less than one (1) micron. In an alternative embodiment, the waveguide core 12a may be configured without tapers as described in connection with FIG. 3.

Figure 7:
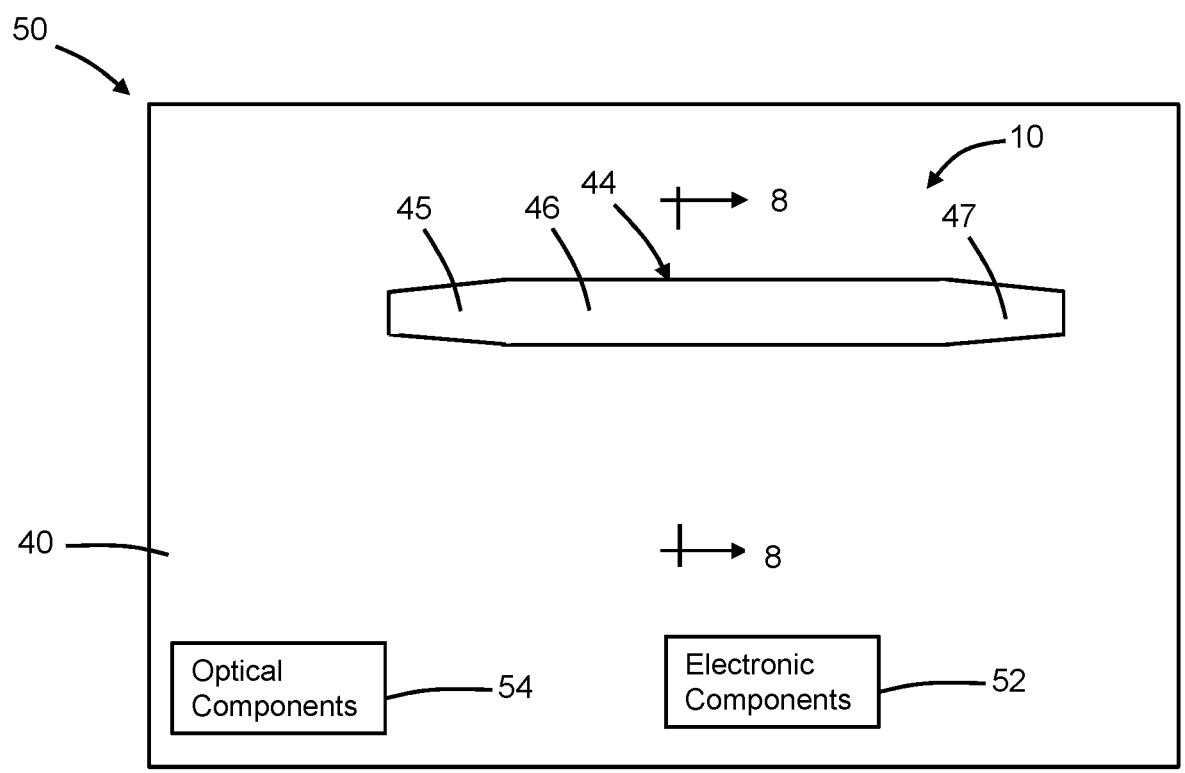
FIG. 7 is a top view of a structure in accordance with alternative embodiments of the invention.
Figure 8:
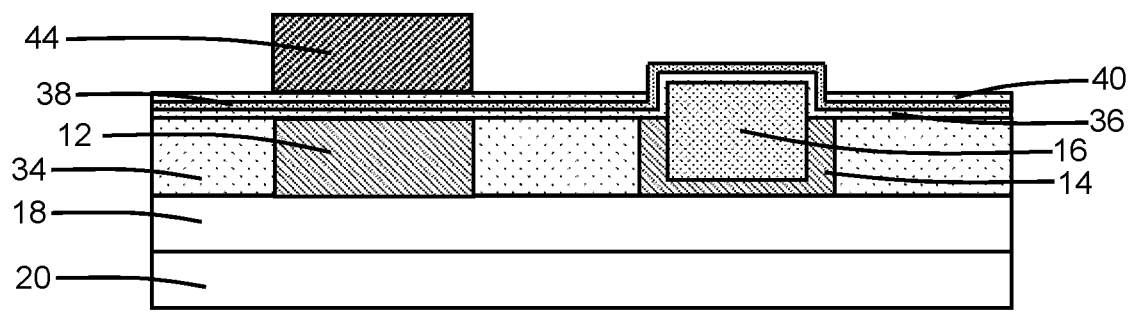
FIG. 8 is a cross-sectional view taken generally along line 8-8 in FIG. 7.

With reference to FIGS. 7, 8 in which like reference numerals refer to like features in FIGS. 1, 2 and in accordance with alternative embodiments of the invention, a waveguide core 44 may be positioned over the waveguide core 12 in a non-contacting relationship. In particular, the waveguide core 44 may include a section 46 that is positioned over the non-tapered section 23 of the waveguide core 12, a taper 45 that is positioned over the taper 22 of the waveguide core 12, and a taper 47 that is positioned over the taper 24 of the waveguide core 12. The tapers 45, 47 terminate the opposite ends of the section 46. The waveguide core 44 may be formed from a layer of a dielectric material, such as silicon nitride, that is deposited and patterned by lithography and etching processes. In an alternative embodiment, the waveguide core 44 may be composed of polysilicon. Processing continues with the formation of a dielectric layer (not shown) composed of silicon dioxide and the back-end-of-line stack 42.

In use, one mode component, such as the TM mode component (e.g., the fundamental TM mode component or higher-order TM modes), of the optical signals may be coupled from the waveguide core 12 to the waveguide core 14 due to phase matching and may be absorbed within the structure 10. The other mode component, such as the TE mode component (e.g., the TE mode component), of the optical signals passes through the structure 10 with negligible loss to be further guided on the photonics chip 50 to a downstream destination by the waveguide core 12.

In an alternative embodiment, the waveguide core 44 may be positioned over the waveguide core 12a.

Figure 9:
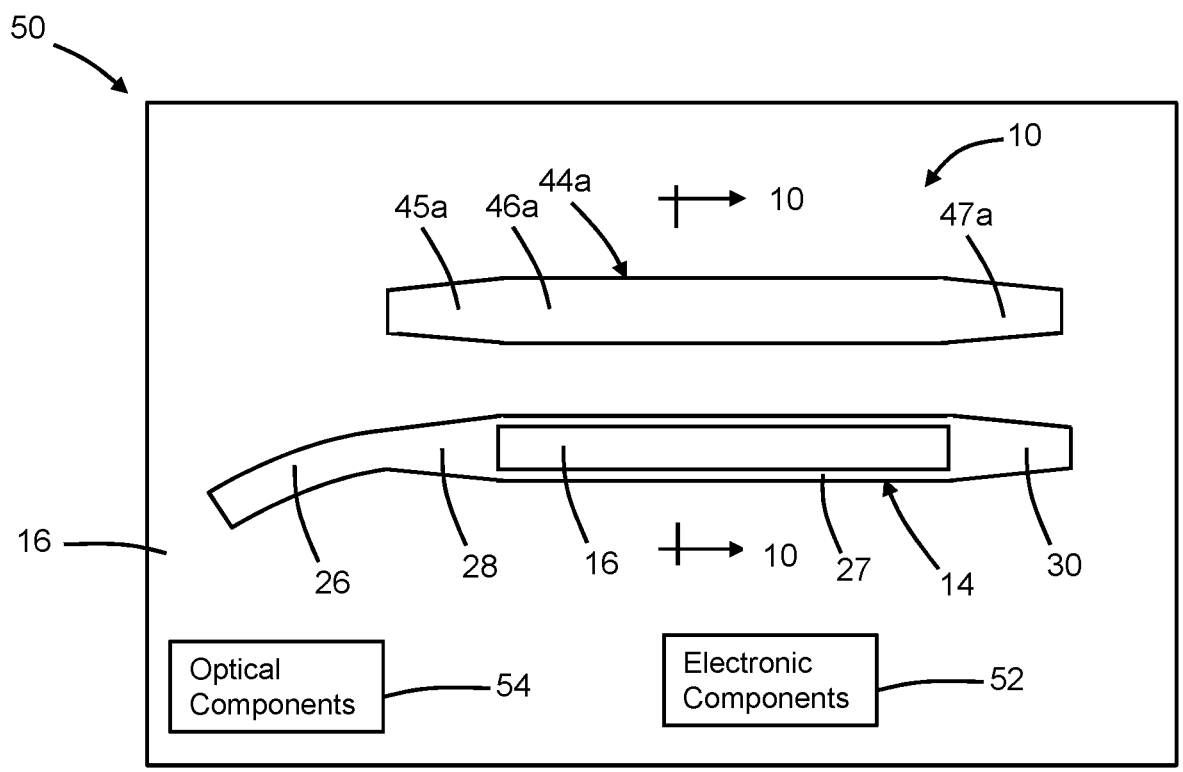
FIG. 9 is a top view of a structure in accordance with alternative embodiments of the invention.
Figure 10:
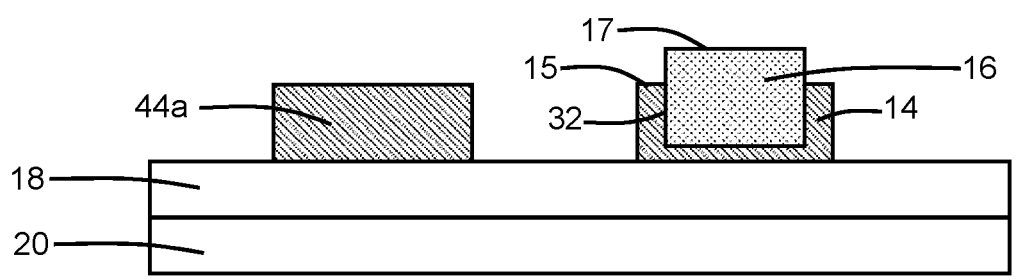
FIG. 10 is a cross-sectional view taken generally along line 10-10 in FIG. 9.

With reference to FIGS. 9, 10 in which like reference numerals refer to like features in FIGS. 1, 2 and in accordance with alternative embodiments of the invention, a waveguide core 44a may be positioned adjacent to the waveguide core 14. In particular, the waveguide core 44a may include a section 46a, a taper 45a, and a taper 47a. The tapers 45a, 47a terminate the opposite ends of the section 46a. The waveguide core 44a may be formed when the waveguide core 14 is patterned by lithography and etching processes, and the waveguide core 44a may be composed of single-crystal semiconductor material (e.g., single-crystal silicon).

Figure 11:
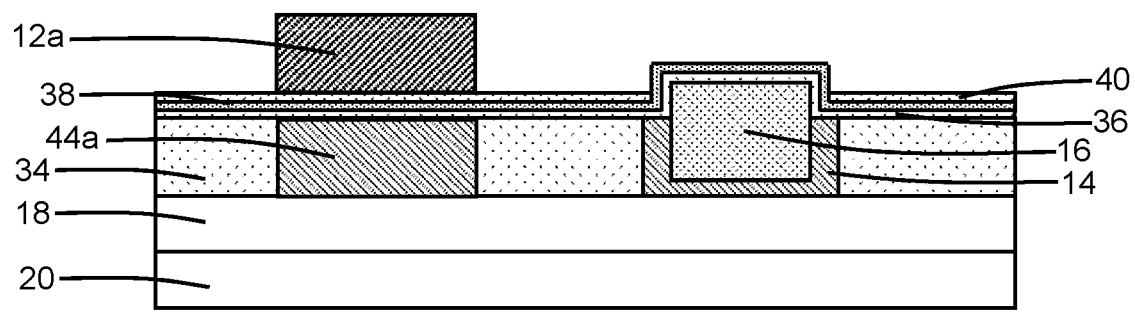
FIG. 11 is a cross-sectional view of the structure at a fabrication stage subsequent to FIG. 10.

With reference to FIG. 11 in which like reference numerals refer to like features in FIG. 10 and at a subsequent fabrication stage, the waveguide core 12a composed of a dielectric material (e.g., silicon nitride) is formed as described in connection with FIGS. 5, 6. The waveguide core 44a is arranged below the waveguide core 12a in a non-contacting relationship. In particular, the section 46a of the waveguide core 44a is positioned below the non-tapered section 23a of the waveguide core 12a, the taper 45a is positioned below the taper 22a of the waveguide core 12a, and the taper 47a is positioned below the taper 24 of the waveguide core 12. Processing continues with the formation of a dielectric layer (not shown) composed of silicon dioxide and the back-end-of-line stack 42 over the dielectric layer.

Figure 12:
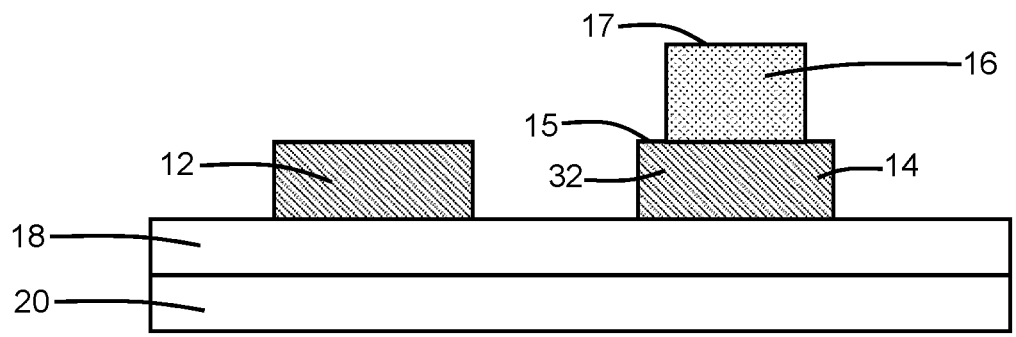
FIG. 12 is a cross-sectional view of a structure in accordance with alternative embodiments of the invention.

With reference to FIG. 12 in which like reference numerals refer to like features in FIG. 2 and in accordance with alternative embodiments of the invention, the absorber 16 may include a layer of the material that is formed directly on, and in direct contact with, the top surface 15 of the waveguide core 14 without initially forming a trench. The layer may be epitaxially grown from the single-crystal material of the top surface 15 of the waveguide core 14 to form the absorber 16, and the layer may be patterned with lithography and etching processes, after growth, to remove the epitaxially-grown material from portions of the waveguide core 14 other than the section 27. Waveguide core 12 may be covered by a protective layer during the epitaxial growth, which may be removed after the absorber 16 is formed.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarizer, the structure comprising:
a first waveguide core having a section and a first taper connected to the section, the first waveguide core having a top surface, and the first waveguide core comprised of single-crystal silicon;
a second waveguide core laterally positioned adjacent to the first taper of the first waveguide core, the second waveguide core having a top surface;
a third waveguide core positioned over the top surface of the second waveguide core, the third waveguide core comprised of a dielectric material; and
an absorber positioned in a trench defined in the top surface of the section of the first waveguide core, the absorber comprised of germanium.

2. The structure of claim 1 wherein the absorber is fully comprised of germanium.

3. The structure of claim 1 wherein the absorber further comprises silicon.

4. The structure of claim 1 wherein the second waveguide core has a second taper positioned laterally adjacent to the first taper of the first waveguide core.

5. The structure of claim 1 wherein the first waveguide core includes a second taper, and the section of the first waveguide core is terminated by the second taper.

6. The structure of claim 5 wherein the first waveguide core further includes a bend, and the second taper is laterally positioned between the bend and the section of the first waveguide core.

7. The structure of claim 5 wherein the absorber is positioned along a first length of the first waveguide core between the first taper and the second taper.

8. The structure of claim 7 wherein the first waveguide core has a first width, and the absorber has a second width that is less than the first width.

9. The structure of claim 7 wherein the absorber has a second length that is substantially equal to the first length.

10. The structure of claim 1 wherein the first waveguide core includes a second taper, the absorber is positioned along a length of the first waveguide core between the first taper and the second taper.

11. The structure of claim 1 wherein the first waveguide core has a first thickness, and the absorber has a second thickness that is greater than the first thickness.

12. The structure of claim 1 wherein the first waveguide core has a first width, and the absorber has a second width that is less than the first width.

13. The structure of claim 1 wherein the absorber has a first length, the absorber is substantially rectangular over the first length, the section of the first waveguide core has a second length, the section of the first waveguide core is substantially rectangular over the second length, and the first length is substantially equal to the second length.

14. The structure of claim 1 wherein the dielectric material is silicon nitride.

15. A method of forming a structure for a polarizer, the method comprising:
forming a first waveguide core having a section and a first taper connected to the section, wherein the first waveguide core is comprised of single-crystal silicon;
forming a second waveguide core that is laterally positioned adjacent to the first taper of the first waveguide core;
patterning a trench in the first waveguide core;
epitaxially growing an absorber from the single-crystal silicon at surfaces of the section of the first waveguide core about the trench, wherein the absorber is comprised of germanium; and
forming a third waveguide core positioned over the a surface of the second waveguide core, wherein the third waveguide core is comprised of a dielectric material.

16. The method of claim 15 wherein the first waveguide core has a first thickness, and the absorber has a second thickness that is greater than the first thickness.

17. The method of claim 15 wherein the dielectric material is silicon nitride.

* * * * *

UNITED STATES PATENT AND TRADEMARK OFFICE
CERTIFICATE OF CORRECTION

PATENT NO.          : 11,137,543 B2                                             Page 1 of 1
APPLICATION NO.     : 16/727400
DATED               : October 5, 2021
INVENTOR(S)         : Bian et al.

It is certified that error appears in the above-identified patent and that said Letters Patent is hereby corrected as shown below:

In the Claims

Column 8, Claim 15, Line 34, change "over the a" to --over the top--

Column 8, Claim 15, Line 35, change "second" to --first--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*